US011150659B2

(12) United States Patent
Kanehara et al.

(10) Patent No.: US 11,150,659 B2
(45) Date of Patent: Oct. 19, 2021

(54) INFORMATION COLLECTION SYSTEM AND SERVER APPARATUS

(71) Applicant: Toyota Jidosha Kabushiki Kaisha, Toyota (JP)

(72) Inventors: Isao Kanehara, Miyoshi (JP); Kazuhiro Umeda, Nisshin (JP); Hideo Hasegawa, Nagoya (JP); Tsuyoshi Okada, Toyota (JP); Shinjiro Nagasaki, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 16/227,864

(22) Filed: Dec. 20, 2018

(65) Prior Publication Data
US 2019/0196473 A1 Jun. 27, 2019

(30) Foreign Application Priority Data

Dec. 25, 2017 (JP) .............................. JP2017-248221

(51) Int. Cl.
*G05D 1/00* (2006.01)
*A62C 31/00* (2006.01)
(Continued)

(52) U.S. Cl.
CPC ........... *G05D 1/0094* (2013.01); *A62C 31/00* (2013.01); *G05D 1/0088* (2013.01);
(Continued)

(58) Field of Classification Search
CPC ...... G05D 1/0094; G05D 1/00; G05D 1/0088; G05D 1/0231; A62C 31/00;
(Continued)

(56) References Cited

U.S. PATENT DOCUMENTS 9,307,383 B1* 4/2016 Patrick .................... H04W 4/90
9,820,120 B2* 11/2017 deCharms ........... H04L 65/1059
(Continued)

FOREIGN PATENT DOCUMENTS

| CN | 102346969 A | 2/2012 |
| CN | 106656310 A | 5/2017 |

(Continued)

*Primary Examiner* — Ig T An
(74) *Attorney, Agent, or Firm* — Dinsmore & Shohl LLP

(57) ABSTRACT

The autonomous mobile object includes an imaging unit, a positional information sender to acquire and send positional information to a server, and an operation controller to cause the autonomous mobile object to move autonomously based on an operation command. The server includes storage to receive and store the positional information from the autonomous mobile object, a commander to send the operation command to the autonomous mobile object, and a receiver to receive information relating to an emergency report including a target location. When the receiver receives the information relating to the emergency report, the commander sends an emergency operation command to the autonomous mobile object located in a specific area including the target location. The emergency operation command causes the autonomous mobile object to capture an image of the target location, and the autonomous mobile object sends the image to the server.

7 Claims, 8 Drawing Sheets

(51) Int. Cl.
*G06K 9/00* (2006.01)
*G05D 1/02* (2020.01)
*B64C 39/02* (2006.01)
*A62C 13/78* (2006.01)

(52) U.S. Cl.
CPC ....... *G05D 1/0231* (2013.01); *G06K 9/00791* (2013.01); *A62C 13/78* (2013.01); *B64C 39/024* (2013.01); *B64C 2201/127* (2013.01); *G05D 2201/0213* (2013.01)

(58) Field of Classification Search
CPC .......... G06K 9/00791; B60K 2370/175; B61L 2210/02; B64C 2201/141; G05B 2219/32388; G05B 2219/50393
See application file for complete search history.

(56) References Cited

U.S. PATENT DOCUMENTS

| | | | |
|---|---|---|---|
| 9,905,133 B1* | 2/2018 | Kumar | G08G 1/202 |
| 10,380,694 B1* | 8/2019 | Grant | G08G 1/205 |
| 2012/0028599 A1 | 2/2012 | Hatton et al. | |
| 2015/0148988 A1* | 5/2015 | Fleck | B64D 1/14 701/2 |
| 2016/0071418 A1* | 3/2016 | Oshida | B60W 30/165 701/23 |
| 2018/0326901 A1* | 11/2018 | Boyle | G05D 1/0246 |

FOREIGN PATENT DOCUMENTS

| | | |
|---|---|---|
| JP | 2007-018064 A | 1/2007 |
| JP | 2014-006689 A | 1/2014 |
| JP | 2015092320 A | 5/2015 |
| JP | 2016181239 A | 10/2016 |
| JP | 2016-189114 A | 11/2016 |

* cited by examiner

INFORMATION COLLECTION SYSTEM AND SERVER APPARATUS

CROSS REFERENCE TO RELATED APPLICATION

This application claims priority to Japanese Patent Application No. 2017-248221 filed on Dec. 25, 2017, incorporated herein by reference in its entirety.

BACKGROUND

Technical Field

The present disclosure relates to a system that collects information using mobile objects.

Description of the Related Art

There have been developed systems that perform surveillance over an area using mobile objects. For example, Japanese Patent Application Laid-Open No. 2016-181239 discloses a system that collects images using terminals provided in mobile objects to create a virtual surveillance network.

Various studies have been performed on development of services using mobile objects that are capable of moving autonomously. For example, Japanese Patent Application Laid-Open No. 2015-092320 discloses a traffic system for transportation of passengers and goods that dispatches autonomous vehicles on users' demand.

Vehicles described in Japanese Patent Application Laid-Open No. 2015-092320 can be used as the mobile objects described in Japanese Patent Application-Laid-Open No. 2016-181239 to construct a system that is capable of collecting an increased amount of information.

SUMMARY

In cases where an accident or disaster occurs, it is desired to collect information at as early stage. For example, at an early stage after a fire report (or fire call), information is needed as to how great the scale of the fire is and whether roads around the site of fire allow entrance of fire engines.

The system described in Japanese Patent Application Laid-Open No. 2016-181239 can extract images that match the required condition from images previously collected by mobile terminals. However, if mobile objects capable of capturing images are absent in the neighborhood of the reported site of fire, it is not possible to collect information.

The present disclosure solves the above problem. An object of the present disclosure is to enable initial actions to be taken in response to a report by using autonomous mobile objects.

An information collection system according to the present disclosure is a system including an autonomous mobile object and a server apparatus.

Specifically, the autonomous mobile object has an imaging unit configured to capture an image, a positional information sender configured to acquire positional information and send it to the server apparatus, and an operation controller configured to cause the autonomous mobile object to move autonomously on the basis of an operation command. The server apparatus has a storage unit configured to receive the positional information from the autonomous mobile object and store it, a commander configured to send the operation command to the autonomous mobile object, and a receiver configured to receive information relating to an emergency report including information about a target location. When the receiver of the server apparatus receives the information relating to the emergency report, the commander sends an emergency operation command to the autonomous mobile object that is located in a specific area including the target location. The emergency operation command is a command that causes the autonomous mobile object to capture an image of the target location, and the autonomous mobile object sends the image captured according to the emergency operation command to the server apparatus.

The autonomous mobile object is a mobile object that moves autonomously on the basis of a certain operation command. The autonomous mobile object may be an autonomous vehicle. The operation command is information including, for example, information about a destination and/or a travel route and information about a service to be provided by the autonomous mobile object on the route. For example, in the case where the autonomous mobile object is intended for transportation of passengers and/or goods, the operation command may be a command that causes the autonomous mobile object to transport passengers and/or goods along a predetermined route. In the case where the autonomous mobile object is intended for transportation of a shop, facility, or equipment, the operation command may be a command that causes the autonomous mobile object to travel to a certain destination, and prepare the shop, facility, or equipment for service at that place.

The autonomous mobile object has means for capturing images and means for sending positional information to the server apparatus.

The server apparatus is an apparatus that performs management of the autonomous mobile objects.

The server apparatus sends operation commands to the autonomous mobile objects and stores the positional information received from the autonomous mobile objects. When the server apparatus receives information relating to an emergency report, it sends an emergency operation command to an autonomous mobile object(s) that is located in a specific area around the target location. An example of the emergency report is a report of fire, and the emergency report relates to a certain location. According to the emergency operation command, the autonomous mobile object moves to a place near the target location and captures an image(s).

Thus, it is possible to collect information using an autonomous mobile object(s) under operation. Therefore, it is possible to know the circumstances of the site for which the emergency report has been made, enabling proper initial actions to be taken.

Further, if the autonomous mobile object receives the emergency operation command while operating on the basis of a first operation command, the autonomous mobile object may suspend an operation based on the first operation command.

In the case where the autonomous mobile object has an operation command under execution at the time when it receives the emergency operation command, in some embodiments the autonomous mobile object suspends the operation and moves to a designated location.

Further, the emergency report may be a fire report, and the autonomous mobile object may further have fire-extinguishing equipment and make the fire-extinguishing equipment usable when it receives the emergency operation command.

If the autonomous mobile object is provided with fire-extinguishing equipment (such as a fire extinguisher) that is made usable only when the autonomous mobile object receives the emergency operation command, it is possible to deliver the fire-extinguishing equipment expeditiously to the reporter, enabling appropriate first-aid fire-fighting to be performed before the arrival of a fire-fighting team.

Further, the autonomous mobile object may further have a notifier and make the notifier usable when it receives the emergency operation command.

The notifier may be unit configured to provide voice notification or visual notification. For example, the notifier may make a notification that it is suspected that a fire is occurring. This will enable appropriate first-aid fire-fighting to be performed before the arrival of a fire-fighting team.

Further, the emergency operation command may include a command that causes the autonomous mobile object to capture an image of a building present at the target location. Also, the emergency operation command may include a command that causes the autonomous mobile object to capture an image of a street in a neighborhood of the target location.

Capturing images of the building at the target location or the circumstances on the road near the target location enables a fire-fighting organization or the like to know the circumstances of the fire site with improved accuracy.

Further, the autonomous mobile object may further have a sensor unit configured to perform sensing, perform sensing according to the emergency operation command, and send data acquired by sensing also to the server apparatus.

As described above, the autonomous mobile object may send not only the captured images but also the result of sensing by the sensor to the server apparatus. The sensor may typically be, but is not limited to, a smoke sensor. This helps investigation of the circumstances of the fire site that might not be known clearly only by images.

A server apparatus according to the present disclosure is a server apparatus that communicates with an autonomous mobile object that has an imaging unit and moves autonomously on the basis of an operation command, comprising a storage unit configured to receive positional information from the autonomous mobile object and store it, a commander configured to send the operation command to the autonomous mobile object, and a receiver configured to receive information relating to an emergency report including information about a target location, wherein when the receiver receives the information relating to the emergency report, the commander sends an emergency operation command to the autonomous mobile object that is located in a specific area including the target location, the emergency operation command being a command that causes the autonomous mobile objects to capture an image.

According to the present disclosure, there can also be provided an information collection system or a server apparatus including at least one or more of the above-described means. According to another aspect of the present disclosure, there is provided a method carried out by the above-described information collection system or the server apparatus. The processing and means described above may be employed in any combinations, as far as it is technically feasible.

As described above, the present disclosure enables initial actions to be taken using an autonomous mobile object in response to a report.

DESCRIPTION OF THE EMBODIMENTS

First Embodiment

System Configuration

Figure 1:
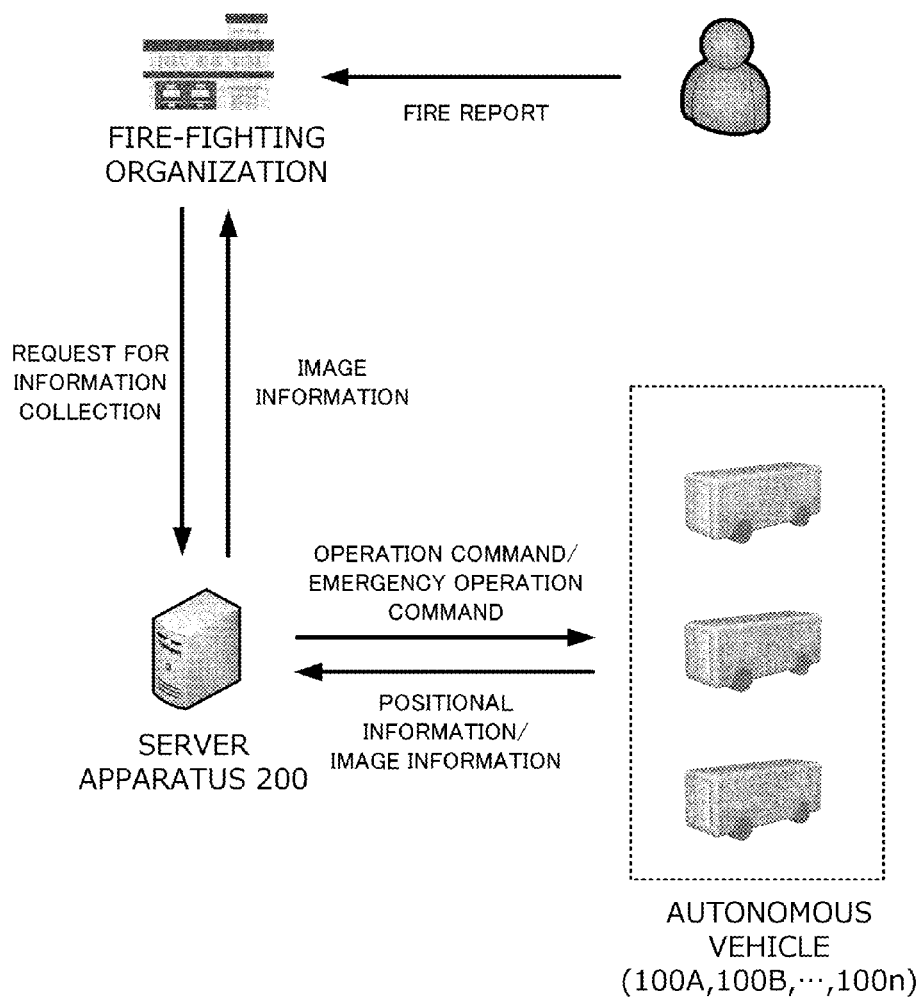
FIG. 1 shows the basic system configuration of an information collection system according to a first embodiment.

The general configuration of an information collection system according to a first embodiment will be described with reference to FIG. 1. The information collection system according to the first embodiment includes a plurality of autonomous vehicles 100A, 100B, . . . 100$n$ that can run autonomously on the basis of commands given thereto and a server apparatus 200 that sends the commands. The autonomous vehicle 100 is a self-driving vehicle that provides a predetermined service. The server apparatus 200 is an apparatus that performs management of the plurality of autonomous vehicles 100. In the following, the plurality of autonomous vehicles 100 will be collectively referred to as autonomous vehicles 100, when it is not necessary to distinguish individual vehicles.

The autonomous vehicles 100 are multipurpose mobile objects that may individually have different functions and can travel on the road autonomously without a human driver. Examples of the autonomous vehicles 100 include vehicles that travel along a predetermined route to pick up and drop off persons, on-demand taxis that operate on users' demand, and mobile shops that enable shop operation at a desired destination. In the case where the autonomous vehicles 100 are intended for transportation of passengers and/or goods, they may transport passengers and/or goods along a predetermined route. In the case where the autonomous vehicles 100 are intended for transportation of a shop, facility, or equipment, they may travel to a destination, and the shop, facility, or equipment may be prepared for operation at that place. The autonomous vehicles 100 may be vehicles that patrol on the road for the purpose of monitoring facilities and/or infrastructures or preventing crimes. In that case, the autonomous vehicles 100 may be configured to travel along a predetermined patrol route. The autonomous vehicles 100 are also called as electric vehicle palettes (EV palettes).

The autonomous vehicles 100 are not required to be vehicles without humans. For example, a sales staff(s), a customer service attendant(s), or an operation monitoring crew(s) may be on board. The autonomous vehicles 100 are not required to be vehicles that can run completely autonomously. For example, they may be vehicles that can be driven by a human driver or accept a human assistance in some circumstances.

Moreover, the autonomous vehicles 100 have the functions of accepting requests by users, responding to the users, performing appropriate processing in response to the users' requests, and reporting the result of processing to the users.

The autonomous vehicles 100 may transfer the requests by users that they cannot fulfil by themselves to the server apparatus 200 so as to fulfil them in cooperation with the server apparatus 200.

The server apparatus 200 is an apparatus that directs the operation of the autonomous vehicles 100. In the case where the autonomous vehicles 100 are on-demand taxis, the server apparatus 200 receives a request by a user to get a location to which an autonomous vehicle 100 is to be dispatched and the user's destination. Then, the server apparatus 200 sends to an autonomous vehicle 100 that is running in the neighborhood of the requested location a command to the effect that the autonomous vehicle 100 is to transport a person(s) from the place of departure to the destination. This command can cause the autonomous vehicle 100 to travel along a specific route. The operation commands are not limited to commands that cause an autonomous vehicle 100 to travel from a place of departure to a destination. Examples of other operation commands may include a command that causes an autonomous vehicle 100 to travel to a determined destination to open a shop at that place and a command that causes an autonomous vehicle 100 to survey streets while traveling along a determined route. As described above, operation commands may specify operations to be done by autonomous vehicles 100 besides traveling.

Besides the above-described functions, the server apparatus 200 of the information collection system according to this embodiment has the function of collecting images using the autonomous vehicles 100, when it is requested by a fire-fighting organization to do so. For example, the server apparatus 200 acquires information about the location at which a fire is reported, then finds an autonomous vehicle(s) 100 running in the neighborhood of that location, and causes the autonomous vehicle(s) 100 to capture images of the target building or place and/or images of the traffic on roads near that place. This helps the fire-fighting organization to know the circumstances of the fire site soon.

The fire-fighting organization mentioned in this specification is not necessarily an administrative organization. It may be, for example, a private fire-fighting group, a fire brigade, or a security company.

System Configuration

In the following, the elements of the system will be described in detail.

Figure 2:
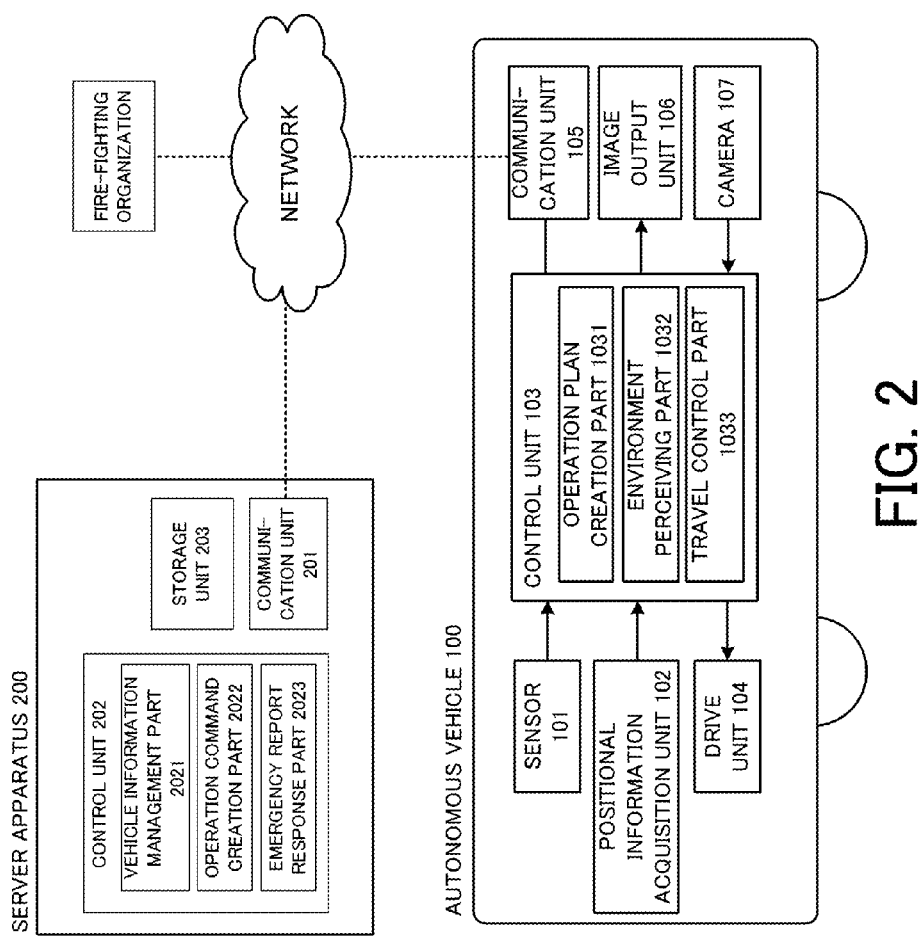
FIG. 2 is a block diagram showing exemplary elements of the information collection system.

FIG. 2 is a block diagram showing an example of the configuration of the autonomous vehicle 100 and the server apparatus 200 shown in FIG. 1. The system may include a plurality of autonomous vehicles 100.

The autonomous vehicle 100 is a vehicle that runs according to a command received from the server apparatus 200. Specifically, the autonomous vehicle 100 creates a traveling route on the basis of the operation command received by wireless communication and travels on the road in an appropriate manner while sensing the environment of the vehicle.

The autonomous vehicle 100 has a sensor 101, a positional information acquisition unit 102, a control unit 103, a driving unit 104, a communication unit 105, and an image output unit 106. The autonomous vehicle 100 operates by electrical power supplied by a battery.

The sensor 101 is a means for sensing the environment of the vehicle, which typically includes a stereo camera, a laser scanner, LIDAR, radar, or the like. Information acquired by the sensor 101 is sent to the control unit 103.

The positional information acquisition unit 102 is means for acquiring the current position of the vehicle, which typically includes a GPS receiver. Information acquired by the positional information acquisition unit 102 is sent to the control unit 103.

The control unit 103 is a computer that controls the autonomous vehicle 100 on the basis of the information acquired through the sensor 101. The control unit 103 is, for example, a microcomputer.

The control unit 103 includes as functional modules an operation plan creation part 1031, as environment perceiving part 1032, and a travel control part 1033. These functional modules may be implemented by executing programs stored in the storage unit, such as a read only memory (ROM), by a central processing unit (CPU).

The operation plan creation part 1031 receives an operation command from the server apparatus 200 and creates an operation plan of the vehicle. In this embodiment, the operation plan is data that specifies a route along which the autonomous vehicle 100 is to travel and a task(s) to be done by the autonomous vehicle 100 during a part or the entirety of that route. Examples of data included in the operation plan are as follows.

(1) Data that specifies a route along which the vehicle is to travel by a set of road links.

The route along which the vehicle is to travel may be created automatically from a given place of departure and a given destination with reference to map data stored in the storage. Alternatively, the route may be created using an external service.

(2) Data specifying a task(s) to be done by the vehicle at a certain location(s) in the route.

Examples of the tasks to be done by the vehicle include, but are not limited to, picking up or dropping off a person(s), loading or unloading goods, opening and closing a mobile shop, collecting data, and outputting an image(s) (on an outside display, which will be described later).

The operation plan created by the operation plan creation part 1031 is sent to the travel control part 1033, which will be described later.

The environment perceiving part 1032 perceives the environment around the vehicle using the data acquired by the sensor 101. What is perceived includes, but is not limited to, the number and the position of lanes, the number and the position of other vehicles present around the vehicle, the number and the position of obstacles (e.g. pedestrians, bicycles, structures, and buildings), the structure of the road, and road signs. What is perceived may include anything that is useful for autonomous traveling.

The environment perceiving part 1032 may track a perceived object(s). For example, the environment perceiving part 1032 may calculate the relative speed of the object from the difference between the coordinates of the object determined in a previous step and the current coordinates of the object.

The data relating to the environment acquired by the environment perceiving part 1032 is sent to the travel control part 1033, which will be described below. This data will be hereinafter referred to as "environment data".

The travel control part 1033 controls the traveling of the vehicle on the basis of the operation plan created by the operation plan creation part 1031, the environment data acquired by the environment perceiving part 1032, and the positional information of the vehicle acquired by the positional information acquisition unit 102. For example, the travel control part 1033 causes the vehicle to travel along a predetermined route in such a way that obstacles will not enter a specific safety zone around the vehicle. A known autonomous driving method may be employed to drive the vehicle.

The driving unit 104 is means for driving the autonomous vehicle 100 according to a command issued by the travel control part 1033. The driving unit 104 includes, for example, a motor and inverter for driving wheels, a brake, a steering system, and a secondary battery.

The communication unit 105 serves as communication means for connecting the autonomous vehicle 100 to a network. In this embodiment, the communication unit 105 can communicate with another device (e.g. the server apparatus 200) via a network using a mobile communication service based on e.g. 3G or LTE.

The communication unit 105 may further have communication means for inter-vehicle communication with other autonomous vehicles 100.

Figure 3:
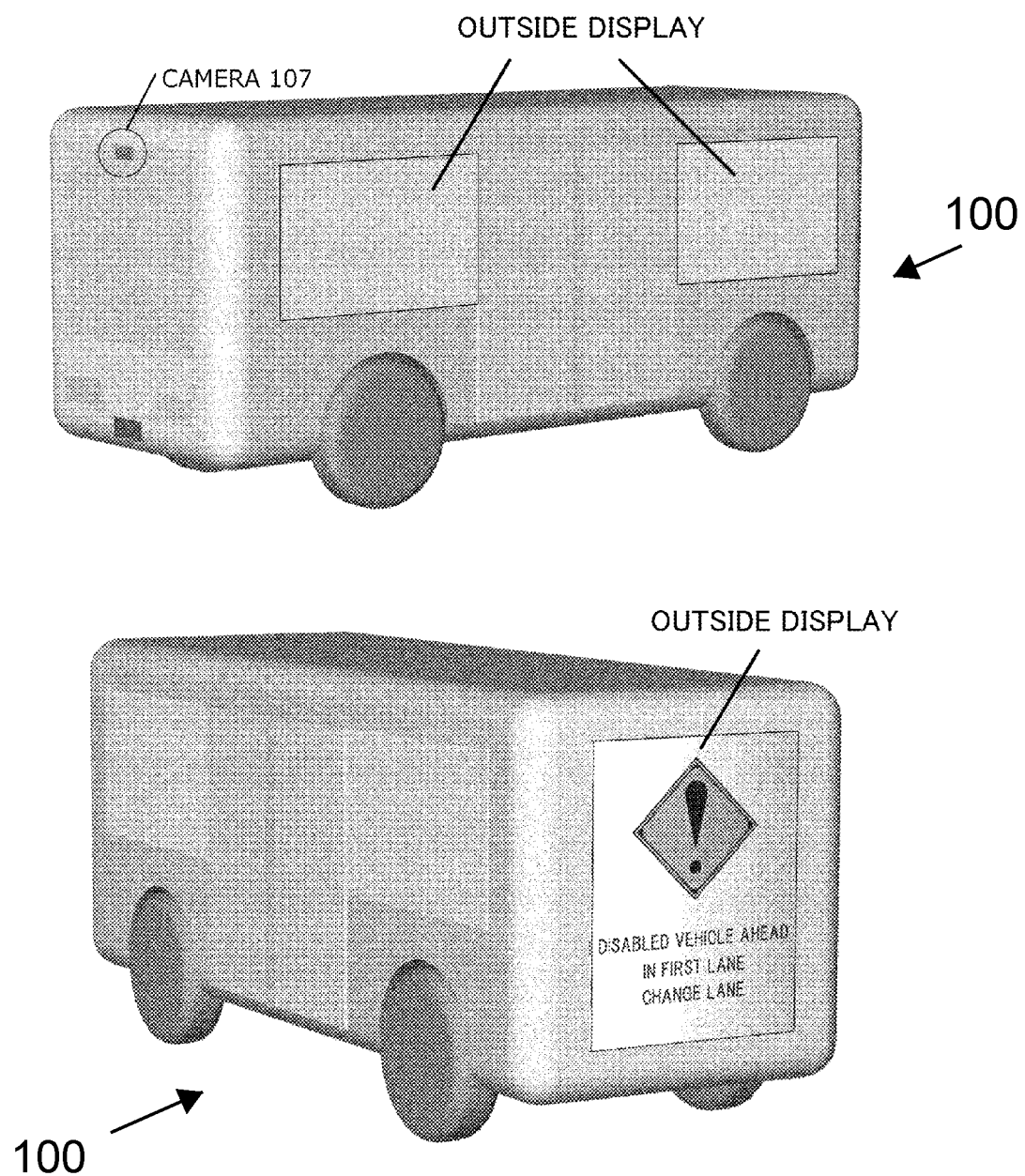
FIG. 3 shows the outer appearance of an autonomous vehicle 100.

The image output unit 106 is a means for outputting images onto an outside display provided on the vehicle. FIG. 3 shows the outer appearance of an exemplary autonomous vehicle 100. As shown in FIG. 3, the autonomous vehicle 100, according to this embodiment, has a plurality of displays provided on the outer side of the vehicle body, onto which desired images can be output. The outside display may be, for example, a liquid crystal display or an LED matrix. The image output unit 106 can create or receive images on the basis of data in the operation plan and output the images onto the outside display.

The camera 107 is a camera 107 provided on a vehicle body of the autonomous vehicle 100, which is an image pickup apparatus using an image sensor such as a charge-coupled device (CCD) metal oxide semiconductor (MOS), or complementary metal oxide semiconductor (CMOS) sensor.

As shown in FIG. 3, the autonomous vehicle 100 according to this embodiment is provided with an on-vehicle camera 107 that can capture images (still images or moving images). While FIG. 3 shows only one camera 107, the autonomous vehicle 100 may have a plurality of cameras 107 provided on different portions of the vehicle body. For example, cameras 107 may be provided on the front, rear, and right and left sides of the vehicle body.

Now, the server apparatus 200 will be described.

The server apparatus 200 is configured to manage the position of the running autonomous vehicles 100 and send operation commands. For example, in the case where the server apparatus 200 receives from a user a request for dispatch of a taxi, the server apparatus 200 acquires the location of departure and the destination and sends an operation command to an autonomous vehicle 100 that is running in the neighborhood of the place of departure and capable of serving as a taxi.

The server apparatus 200 has a communication unit 201, a control unit 202, and a storage unit 203.

The communication unit 201 is, as with the above-described communication unit 105, a communication interface for communication with autonomous vehicles 100 via a network.

The control unit 202 is means for controlling the server apparatus 200. The control unit 202 is constituted by, for example, a CPU.

The control unit 202 includes as functional modules a vehicle information management part 2021, an operation command creation part 2022, and an emergency report response part 2023. These functional modules may be implemented by executing programs stored in storage means, such as a read only memory (ROM), by the CPU.

The vehicle information management part 2021 manages a plurality of autonomous vehicles 100 that are under its management. Specifically, the vehicle information management part 2021 receives positional information from the plurality of autonomous vehicles 100 at predetermined intervals and stores the information in association with the date and time in the storage unit 203, which will be described later. Moreover, the vehicle information management part 2021 holds and updates data about characteristics of the autonomous vehicles 100, if necessary. This data will be hereinafter referred to as "vehicle information". Examples of the vehicle information include, but are not limited to, the identification of each autonomous vehicle 100, the service type, information about the location at which each vehicle is on standby (e.g. car shed or service office), the door type, the vehicle body size, the carrying capacity, the maximum number of passengers, the full charge driving range, the present (or remaining) driving range, and the present status (such as empty, occupied, running, or under operation etc.).

When a request for dispatch of an autonomous vehicle 100 is received from outside, the operation command creation part 2022 determines the autonomous vehicle 100 to be dispatched and creates an operation command according to the vehicle dispatch request. Examples of the vehicle dispatch request are, but not limited to, as follows:

(1) request for transportation of passengers or goods

This is a request for transportation of a passenger(s) or goods with designation of a place of departure and a destination or a route to be followed.

(2) request for dispatch of an autonomous vehicle 100 having a specific function This is a request for dispatch of an autonomous vehicle 100 that has a specific function, such as the function as a shop (e.g. eating house, sales booth, or showcase), an office of a business entity (e.g. private office or service office), or a public facility (e.g. branch of a city office, library, or clinic). The place to which an autonomous vehicle 100 is to be dispatched may be either a single place or multiple places. In the case of multiple places, service may be provided at each of the places.

(3) Request for Patrol on the Road

This is a request for patrol on the road for the purpose of monitoring facilities and/or infrastructures or preventing crimes.

Vehicle dispatch requests are received from users via, for example, a network. The sender of a vehicle dispatch request is not necessarily an ordinary user. For example, the organization that provides the service with the autonomous vehicles 100 may send a vehicle dispatch request.

The autonomous vehicle 100 to which an operation command is to be sent is determined taking account of the positional information of the vehicles and the vehicle information (indicating what function each vehicle has) that the vehicle information management part 2021 has received.

The emergency report response part 2023 sends to an autonomous vehicle 100 that is operating according to an operation command it has received a further operation command based on an emergency report.

Specifically, in response to a request for information collection (information collection request) sent by a fire-fighting organization that has received a fire report (or fire call), an autonomous vehicle(s) 100 that is running in the neighborhood of the reported fire site is dispatched to a specific location so as to capture images. Such an operation command based on an emergency report will be referred to as an "emergency operation command" hereinafter.

The autonomous vehicle 100 that has received an emergency operation command suspends its operation and performs an operation based on the emergency operation command. This operation will be hereinafter referred to as "emergency operation". Details of the emergency operation will be described later.

The storage unit 203 is means for storing information, which is constituted by a storage medium such as a RAM, a magnetic disc, or a flash memory.

Operations under Normal Circumstances

Figure 4:
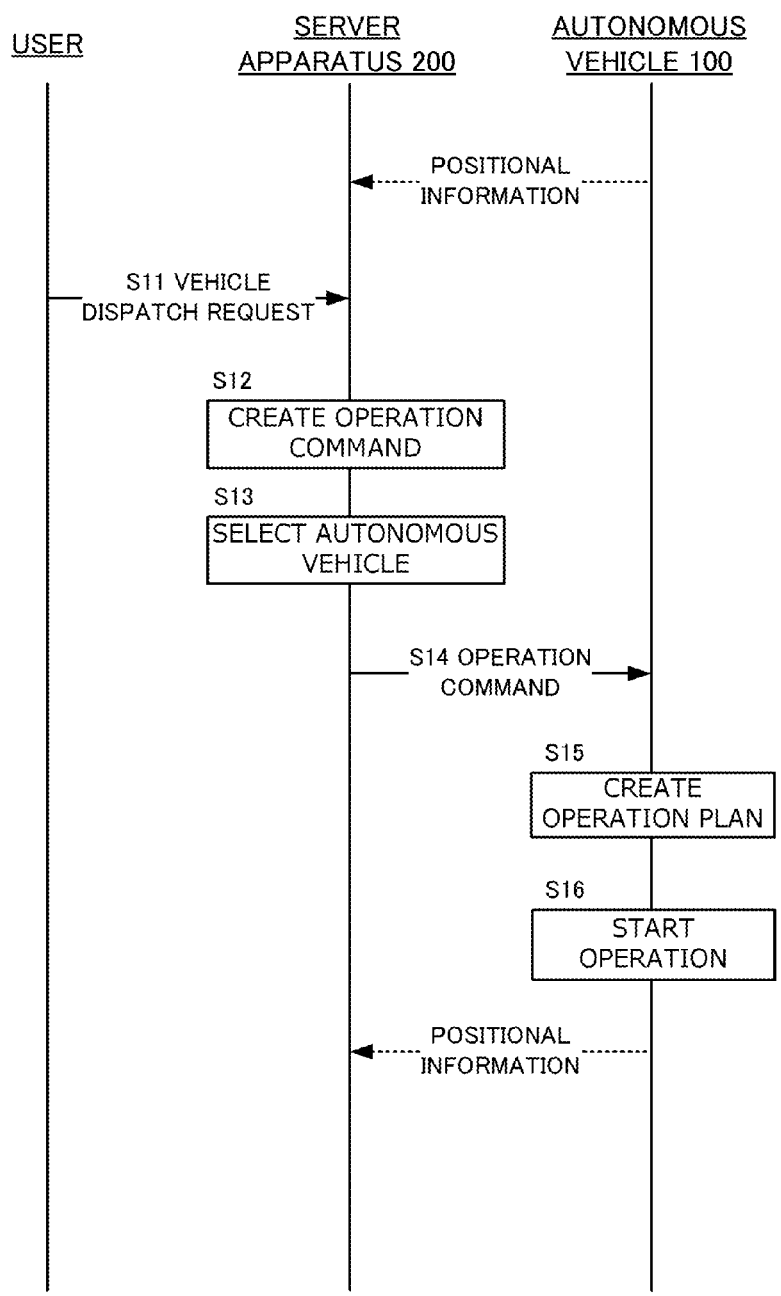
FIG. 4 is a diagram showing dataflow between elements of the system.

Processing that is performed by each of the above-described components will now be described. FIG. 4 is a diagram illustrating dataflow during the process in which the server apparatus 200 creates an operation command based on a request by a user and an autonomous vehicle 100 starts to operate. Here, a case in which the autonomous vehicle 100 runs in a road network shown in FIG. 5 will be described by way of example.

The autonomous vehicle 100 sends positional information periodically to the server apparatus 200. For example, in the case shown in FIG. 5, the autonomous vehicle 100 informs the server apparatus 200 of its location at node A, and the vehicle information management part 2021 stores the association of the autonomous vehicle 100 with node A as data in the storage unit 203. The positional information is not necessarily positional information of a node itself. For example, the positional information may be information that specifies a node or link. A link may be divided into a plurality of sections. The road network is not necessarily a network represented by nodes and links. The positional information is updated every time the autonomous vehicle 100 moves.

If a user sends a vehicle dispatch request to the server apparatus 200 by communication means (step S11), the server apparatus 200 (specifically, the operation command creation part 2022) creates an operation command according to the vehicle dispatch request (step S12). The operation command may designate a place of departure and a destination or only a destination. Alternatively, the operation command may designate a travel route. The operation command may include information about a task to be done or a service to be provided on the route. Here, a case in which a request for transportation of a person from node B to node C is made will be described.

Figure 5:
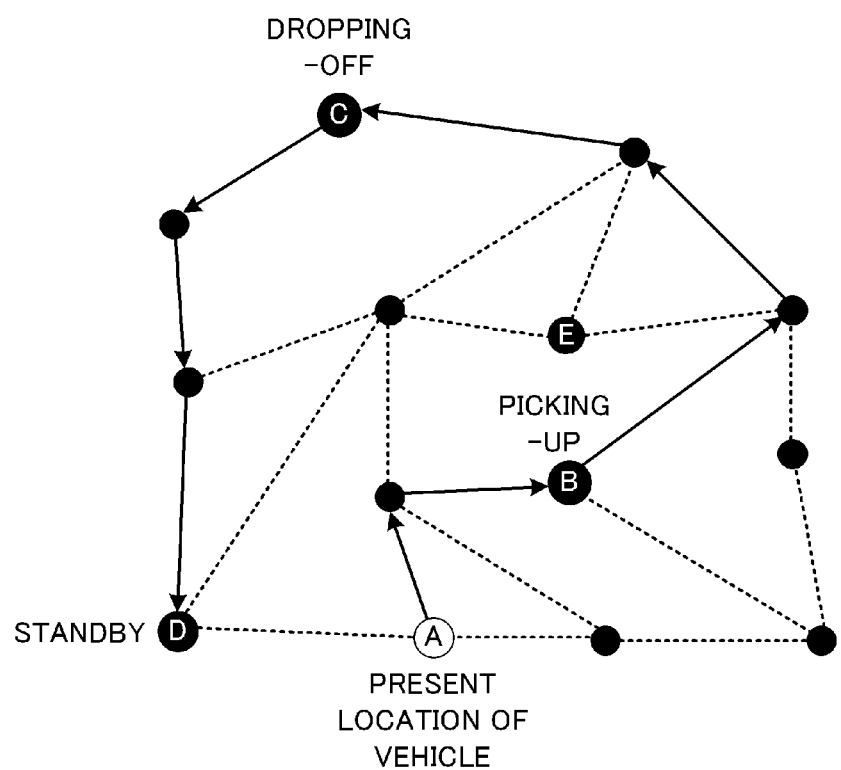
FIG. 5 is a diagram showing an exemplary road network.

In step S13, the operation command creation part 2022 selects an autonomous vehicle 100 that is to provide the service. For example, the operation command creation part 2022 determines an autonomous vehicle 100 that can provide the requested service and can be delivered to the user within a predetermined time, with reference to the stored positional information and vehicle information of the autonomous vehicles 100. Here, let us assume that the vehicle located at node A in FIG. 5 is selected. Consequently, the server apparatus 200 sends an operation command to the selected autonomous vehicle 100 (step S14).

In step S15, the autonomous vehicle 100 (specifically, the operation plan creation part 1031) creates an operation plan on the basis of the operation command it has received. In the case described here, for example, the autonomous vehicle 100 creates an operation plan to the effect that the autonomous vehicle 100 is to travel along the route indicated by the solid arrows in FIG. 5, pick up and drop off a person at node B and node C respectively, and return to node D. The operation plan thus created is sent to the travel control part 1033, and then the operation is started (step S16). Positional information is sent to the server apparatus 200 periodically during the operation also.

While in the above-described case the operation command is created on the basis of a vehicle dispatch request sent from an external source (i.e. a user), the operation command does not necessarily have to be created on the basis of a vehicle dispatch request sent from an external source. For example, the server apparatus 200 may create an operation command autonomously. Moreover, the creation of an operation plan does not necessarily have to be based on an operation command. For example, in cases where an autonomous vehicle 100 performs patrol for the purpose of surveying streets, the autonomous vehicle 100 may create an operation plan without receiving external instructions. Alternatively, an operation plan may be created by the server apparatus 200.

Operations Under the Presence of a Fire Report

Next, the operation of the system in cases where a fire report has been made will be described.

Firstly, a fire-fighting organization that has received a fire report sends to the server apparatus 200 an information collection request instead of the vehicle dispatch request in step S11. The information collection request includes an information about the location at which a fire is reported. This location will be hereinafter referred to as the "reported location".

After receiving the information collection request, the server apparatus 200 (specifically, the emergency report response part 2023) creates an operation command to the effect that an autonomous vehicle 100 is to capture images in the area around the reported location and determines the autonomous vehicle 100 that is to perform an emergency operation by a process similar to that described above with respect to steps S12 and S13.

The autonomous vehicle 100 that is to perform the emergency operation can be determined on the basis of the positional information of the autonomous vehicles 100 stored in the server apparatus 200. For example, a vehicle that meets a specific condition may be selected from the autonomous vehicles 100 that are located in a specific area including the reported location. Two or more autonomous vehicles 100 may be selected.

In the case described here, let us assume that node E is the reported location, and an autonomous vehicle 100 located at node B is selected as the autonomous vehicle 100 that is to perform the emergency operation.

Figure 6:
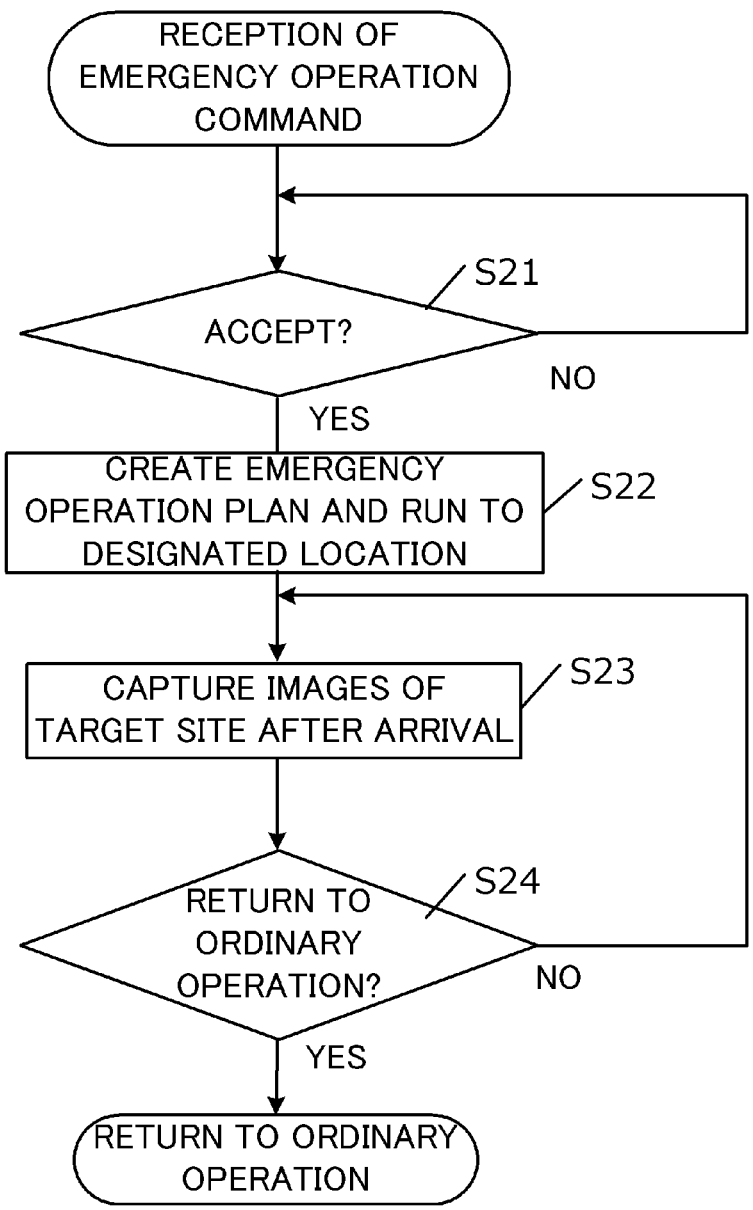
FIG. 6 is a flow chart of a process executed by the autonomous vehicle 100 when performing an emergency operation.

FIG. 6 is a flow chart of a process performed by an autonomous vehicle 100 that has received an emergency operation command.

Firstly in step S21, it is determined whether or not to accept the emergency operation command. There may be situations in which an autonomous vehicle 100 had better not accept an emergency operation command because of its own emergency. An example of such situations is that the autonomous vehicle 100 is employed by a medical institution and transporting a patient. In such cases, the autonomous vehicle 100 may determine not to accept the emergency operation command. The autonomous vehicle 100 may consult the user on board and accept the emergency operation command only when user's consent is obtained.

In step S22, the autonomous vehicle 100 creates an operation plan (i.e. emergency operation plan) on the basis of the emergency operation command and runs for the designated reported location. The operation that has been performed by the autonomous vehicle 100 is suspended. In the case shown in FIG. 5, the autonomous vehicle 100 receives the emergency operation command while it is traveling from node B to node C. Then, node E is set as a temporary destination.

When reaching the neighborhood of the reported location, the autonomous vehicle 100 starts capturing images (still images or moving images) in step S23. For example, in cases where the reported location is represented by coordinates, the direction toward which image capturing is to be performed is determined from the coordinates of the reported location and the positional information of the autonomous vehicle 100 acquired by the positional information acquisition unit 102, and images of an object (such as building) located at the reported location are taken by the camera 107. In cases where the autonomous vehicle 100 is equipped with a plurality of cameras 107, the camera 107 that is oriented toward the object in the best way may be selected to be used. In cases where the camera 107 is capable of panning and tilting, the camera 107 may be adjusted to appropriate pan and tilt angles.

Moreover, the autonomous vehicle 100 may capture images of circumstances on the road it travels until it comes to the reported location. A plurality of cameras 107 may be employed to capture images. The captured images are sent to the server apparatus 200 (specifically, the emergency report response part 2023) and then transferred to the fire-fighting organization.

In step S24, is determined whether or not to return to the previous operation. Examples of the condition for returning to the previous operation may be, but not limited to, that the number of captured images reaches a predetermined number or that returning is allowed by the fire-fighting organization. In the case where there is a user aboard, whether to return to the previous operation may be determined taking into consideration user's intention. When returning to the previous operation, the autonomous vehicle 100 restarts the suspended operation plan. For example, the autonomous vehicle 100 returns to the predetermined route to continue the operation.

As described above, according to the first embodiment, a temporary operation plan is given to an autonomous vehicle 100 under operation to cause it to function as a mobile object that cheeks up on the circumstances of a fire site. This enables the fire-fighting organization to know the circumstances before dispatching a fire engine, enabling proper initial actions to be taken.

The camera 107 may be either a visible light camera or a camera 107 that analyzes and visualizes infrared light radiated from objects. Using the latter camera 107 (solely or additionally) can visualize heat distribution, enabling more proper initial actions to be taken.

Second Embodiment

In the first embodiment, the autonomous vehicle 100 having received an emergency operation command performs image capturing only. In the second embodiment, the autonomous vehicle 100 arriving at a target site performs notification to people around.

As shown in FIG. 3, the autonomous vehicle 100 is provided with an outside display, onto which images can be output through the image output unit 106.

Figure 7:
FIG. 7 is an exemplary image displayed on an outside display according to a second embodiment.

In the second embodiment, the operation command creation part 2022 of the server apparatus 200 creates or acquires data of an image(s) to be displayed on the outside display and creates an emergency operation command including the image data. The autonomous vehicle 100 arriving at the reported location outputs the image data to its outside display. For example after capturing images, the autonomous vehicle 100 stops on the road shoulder with an image shown in FIG. 7 displayed on the display on the rear of the vehicle to thereby prevent the entrance of other vehicles to the reported location.

While a case where notification is performed by an image has been described in this embodiment, voice may be used to call people's attention to the fire. For example, if the autonomous vehicle 100 has an outside speaker, a voice notification may be performed to call people's attention to the fire. The image data and the voice data may be included in the emergency operation command. Alternatively, image data and voice data stored in the autonomous vehicle 100 may be used.

As described above, notification performed by an autonomous vehicle 100 having received an emergency operation command can provide appropriate information to people around the reported location.

Third Embodiment

The system according to the third embodiment employs an autonomous vehicle 100 provided with fire-extinguishing equipment in addition to the equipment of the autonomous vehicle 100 described in the second embodiment.

Figure 8:
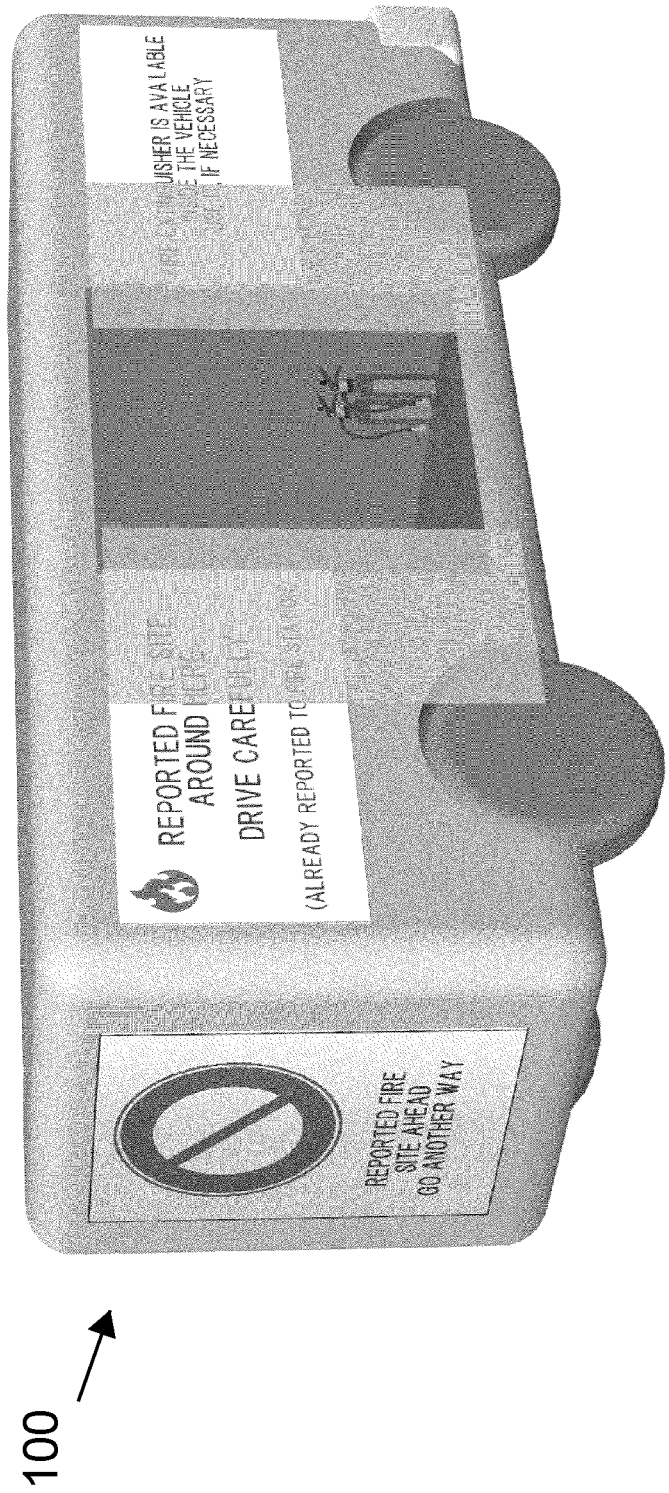
FIG. 8 shows an example of the autonomous vehicle 100 according to a third embodiment.

As shown in FIG. 8, an autonomous vehicle 100 according to the third embodiment is provided with fire-extinguishing equipment, which is made usable when an emergency operation command is received. For example, after the arrival at the reported location, the fire-extinguishing equipment (or its cabinet) may be unlocked to make it usable.

The fire-extinguishing equipment may be provided on the autonomous vehicles 100 regardless of the types of the autonomous vehicles 100. The fire-extinguishing equipment may be stored either in the cabin or in a dedicated storage room (e.g. a trunk). When the fire-extinguishing equipment becomes usable, that fact may be announced by the outside display or the outside speaker.

By this mode, it is possible to deliver fire-extinguishing equipment to the reporter of the fire expeditiously, enabling appropriate first-aid fire-fighting to be performed before the arrival of a fire-fighting team.

Fourth Embodiment

In the first to third embodiments, the autonomous vehicle 100 captures images in the neighborhood of the fire site in response to an emergency operation command and sends the images to the server apparatus 200. In the fourth embodiment, the autonomous vehicle 100 performs sensing in the neighborhood of the fire site in addition to image capturing and sends data acquired by sensing also to the server apparatus 200.

An autonomous vehicle 100 according to the fourth embodiment is equipped with a smoke sensor as a part of the sensor 101. In step S23 of the above-described process shown in FIG. 6, the autonomous vehicle 100 acquires data by sensing in addition to image capturing and sends the data acquired by sensing to the server apparatus 200.

This mode facilitates investigation of the circumstances of the fire site that might not be known clearly only by images.

While in this embodiment use of a smoke sensor has been described by way of example, the autonomous vehicle 100 may use any sensors that can determine whether a fire is present or absent or the extent of fire. For example, a temperature sensor, an infrared sensor, or a sensor capable of generating data of heat distribution may be used.

Modifications

The above-described embodiments are merely exemplary modes, to which modifications can be made without departing from the essence of the present disclosure.

While in the above-described cases only one autonomous vehicle 100 performs emergency operation, a plurality of autonomous vehicles 100 may be employed to perform emergency operation. Acquiring information from a plurality of vehicles can improve accuracy.

When a certain autonomous vehicle 100 returns from emergency operation to ordinary operation, another autonomous vehicle 100 may take over the emergency operation.

In the above-described embodiments, the autonomous vehicle 100 arriving at the reported location captures images automatically. Alternatively, the autonomous vehicle 100 may be configured to allow remote control. For example, remote adjustment of the position and angle of the camera 107 and remote voice announcement can refine the operation.

While in the above-described embodiments images are captured by a camera 107 provided on the autonomous vehicle 100, the camera 107 used to capture images is not limited to a camera 107 fixedly mounted on the vehicle. For example, images may be captured using an unmanned aircraft, such as a drone. The autonomous vehicle 100 may be provided with a base for landing and takeoff of the unmanned aircraft.

While in the above embodiments a fire report has been described as an exemplary emergency report, the emergency report is not limited to this. For example, what is reported may be an emergency case. In the case where what is reported is an emergency case, the autonomous vehicle 100 may provide medical equipment, such as an AED, instead of the fire-extinguishing equipment in the third embodiment.

What is claimed is:

1. An information collection system comprising one or more autonomous mobile objects and a server apparatus, the autonomous mobile object comprising:
    an imaging unit configured to capture an image;
    a positional information sender configured to acquire positional information and send it to the server apparatus; and
    an operation controller configured to cause the autonomous mobile object to move autonomously on the basis of an operation command; and the server apparatus comprising:
    a storage unit configured to receive the positional information from the autonomous mobile object and store it;
    a commander configured to send the operation command to the autonomous mobile object; and
    a receiver configured to receive information relating to an emergency report including information about a target location,
    wherein when the receiver of the server apparatus receives the information relating to an emergency report, the commander sends an emergency operation command to at least one autonomous mobile object that is located in a specific area including the target location, the emergency operation command being a command that causes the at least one autonomous mobile object to capture an image of the target location, and the at least one autonomous mobile object sends the image captured according to the emergency operation command to the server apparatus,
    wherein the autonomous mobile object receives the emergency operation command while operating on the basis of a first operation command, suspends an operation based on the first operation command, generates an emergency operation plan based on the emergency operation command, and starts travelling toward the specific target location, and
    wherein upon completion of the emergency operation plan based on the emergency operation command, the autonomous mobile object returns to the operation based on the first operation command that was suspended in response to receiving the emergency operation command.

2. An information collection system according to claim 1, wherein the emergency report is a fire report, and the autonomous mobile object further comprises fire-extinguishing equipment and makes the fire-extinguishing equipment usable when it receives the emergency operation command.

3. An information collection system according to claim 2, wherein the autonomous mobile object further comprises a notifier and makes the notifier usable when it receives the emergency operation command.

4. An information collection system according to claim 1, wherein the emergency operation command comprises a command that causes the autonomous mobile object to capture an image of a building present at the target location.

5. An information collection system according to claim 4, wherein the emergency operation command comprises a command that causes the autonomous mobile object to capture an image of a street in the neighborhood of the target location.

6. An information collection system according to claim 1, wherein the autonomous mobile object further comprises a sensor unit configured to perform sensing, performs sensing according to the emergency operation command, and sends data acquired by sensing also to the server apparatus.

7. A server apparatus that communicates with an autonomous mobile object that has an imaging unit and moves autonomously on the basis of an operation command, comprising:
    a storage unit configured to receive positional information from the autonomous mobile object and store it;
    a commander configured to send the operation command to the autonomous mobile object; and
    a receiver configured to receive information relating to an emergency report including information about a target location,
    wherein when the receiver receives the information relating to an emergency report, the commander sends an emergency operation command to one or more autonomous mobile objects that are located in a specific area including the target location, the emergency operation command being a command that causes the autonomous mobile objects to capture an image,
    wherein the autonomous mobile object receives the emergency operation command while operating on the basis of a first operation command, suspends an operation based on the first operation command, generates an emergency operation plan based on the emergency operation command, and starts travelling toward the specific target location, and wherein upon completion of the emergency operation plan based on the emergency operation command, the autonomous mobile object returns to the operation based on the first operation command that was suspended in response to receiving the emergency operation command.

* * * * *